United States Patent
Xu et al.

(10) Patent No.: US 11,455,582 B2
(45) Date of Patent: Sep. 27, 2022

(54) SYSTEMS AND METHODS FOR OPTIMIZING AN ONLINE ON-DEMAND SERVICE

(71) Applicant: BEIJING DIDI INFINITY TECHNOLOGY AND DEVELOPMENT CO., LTD., Beijing (CN)

(72) Inventors: Zhe Xu, Beijing (CN); Zhixin Li, Beijing (CN); Qingwen Guan, Beijing (CN); Dingshui Zhang, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 18 days.

(21) Appl. No.: 16/901,050

(22) Filed: Jun. 15, 2020

(65) Prior Publication Data

US 2020/0311650 A1 Oct. 1, 2020

Related U.S. Application Data

(63) Continuation of application No. PCT/CN2017/116635, filed on Dec. 15, 2017.

(51) Int. Cl.
*G06Q 10/06* (2012.01)
*G06Q 30/06* (2012.01)
(Continued)

(52) U.S. Cl.
CPC . *G06Q 10/063112* (2013.01); *G06Q 30/0635* (2013.01); *G08G 1/202* (2013.01); *B60W 40/09* (2013.01)

(58) Field of Classification Search
CPC ....... G06Q 10/063112; G06Q 30/0635; G08G 1/202; B60W 40/09
See application file for complete search history.

(56) References Cited

U.S. PATENT DOCUMENTS

| 8,190,318 B2 | 5/2012 | Li et al. |
| 9,434,389 B2 | 9/2016 | Harsham et al. |

(Continued)

FOREIGN PATENT DOCUMENTS

| CN | 101355714 A | 1/2009 |
| CN | 101739615 A | 6/2010 |

(Continued)

OTHER PUBLICATIONS

Philippe et al "Dynamic Allocation Strategies using Minimum Volatility", Barra an MSCI Brand, pp. 1-5 (Year: 2013).*

(Continued)

*Primary Examiner* — Romain Jeanty
(74) *Attorney, Agent, or Firm* — Metis IP LLC

(57) ABSTRACT

Systems and methods for optimizing an online on-demand service are provided. A method may include: obtaining driver information associated with a plurality of historical drivers corresponding to the plurality of historical orders; for each historical driver during a predetermined period of time, determining a plurality of records based on the order information and the driver information according to a decision-making processes, each record includes a driver's space-time status, a driver's action, a driver's revenue, and a driver's subsequent space-time status; and determining a value function based on the plurality of records of each historical driver according to a reinforcement learning algorithm.

18 Claims, 11 Drawing Sheets

(51) Int. Cl.
*G08G 1/00* (2006.01)
*B60W 40/09* (2012.01)

(56) References Cited

U.S. PATENT DOCUMENTS

| | | | | |
|---|---|---|---|---|
| 2002/0107720 | A1* | 8/2002 | Martin | G06Q 10/06314 705/7.24 |
| 2003/0140088 | A1 | 7/2003 | Robinson et al. | |
| 2016/0129787 | A1 | 5/2016 | Netzer | |
| 2016/0146615 | A1 | 5/2016 | Abhishek | |
| 2017/0039890 | A1* | 2/2017 | Truong | G09B 19/167 |
| 2017/0228683 | A1* | 8/2017 | Hu | G08G 1/00 |
| 2018/0025408 | A1* | 1/2018 | Xu | G06Q 30/0635 705/26.81 |
| 2018/0033112 | A1* | 2/2018 | Wu | H04L 67/18 |
| 2018/0129999 | A1 | 5/2018 | Zhang et al. | |
| 2019/0206008 | A1* | 7/2019 | Dutta | G06N 7/005 |

FOREIGN PATENT DOCUMENTS

| | | |
|---|---|---|
| CN | 102752393 A | 10/2012 |
| CN | 104157133 A | 11/2014 |
| CN | 105006145 A | 10/2015 |
| CN | 105489001 A | 4/2016 |
| CN | 106022577 A | 10/2016 |
| CN | 106530188 A | 3/2017 |
| CN | 107133697 A | 9/2017 |
| CN | 107153916 A | 9/2017 |
| CN | 107464001 A | 12/2017 |
| EP | 2998178 A1 | 3/2016 |
| TW | I512668 B | 12/2015 |

OTHER PUBLICATIONS

International Search Report in PCT/CN2017/116635 dated Aug. 29, 2018, 4 pages.
Written Opinion in PCT/CN2017/116635 dated Aug. 29, 2018, 4 pages.
First Office Action in Chinese Application No. 201780088407.6 dated Apr. 14, 2020, 21 pages.
Huigui Rong et al., The Rich and the Poor: A Markov Decision Process Approach to Optimizing Taxi Driver Revenue Efficiency, Proceedings of the 25th ACM International on Conference on Information and Knowledge Management, 2016, 6 pages.
Notice of Reasons for Rejection in Japanese Application No. 2020-508436 dated Mar. 15, 2021, 7 pages
"Uber Drive Schedule Optimization", Web page <https://github.com/ivan-Zhou/Uber_Driver_Schedule_Optimization>, Jul. 12, 2017.

* cited by examiner

500

┌─────────────────────────────────────────┐
│ Obtaining order information associated with a │ 510
│ plurality of historical orders                 │
└─────────────────────────────────────────┘
                    ↓
┌─────────────────────────────────────────┐
│ Obtaining driver information associated with a │ 520
│ plurality of historical drivers corresponding to│
│ the plurality of historical orders             │
└─────────────────────────────────────────┘
                    ↓
┌─────────────────────────────────────────┐
│ For each historical driver during a            │ 530
│ predetermined period of time, determining a    │
│ plurality of records based on the order        │
│ information and the driver information according│
│ to a Markov Decision Process (MDP) model,      │
│ each record includes a driver's space-time     │
│ status, a driver's action, a driver's revenue, and│
│ a driver's subsequent space-time status        │
└─────────────────────────────────────────┘
                    ↓
┌─────────────────────────────────────────┐
│ Determining a value function based on the      │ 540
│ plurality of records of each historical driver │
│ according to a reinforcement learning algorithm│
└─────────────────────────────────────────┘
                    ↓
┌─────────────────────────────────────────┐
│ Optimizing allocations of drivers to incoming  │ 550
│ orders based on the value function             │
└─────────────────────────────────────────┘

FIG. 5

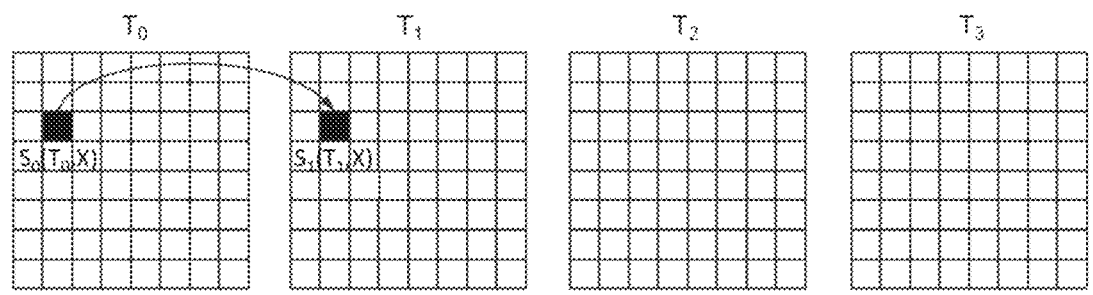
FIG. 6-A
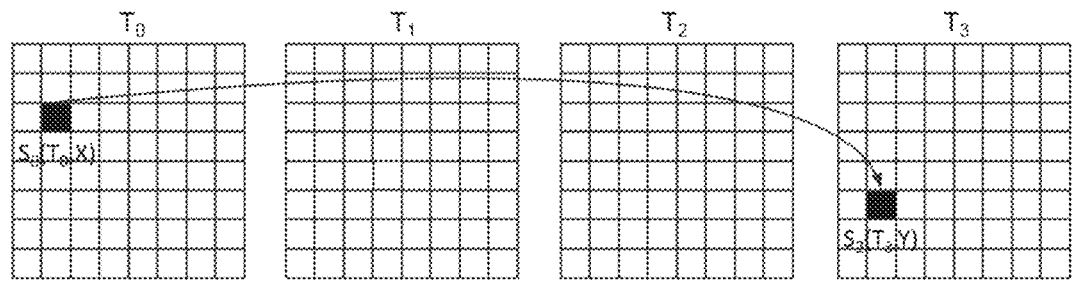
FIG. 6-B

SYSTEMS AND METHODS FOR OPTIMIZING AN ONLINE ON-DEMAND SERVICE

CROSS-REFERENCE TO RELATED APPLICATIONS

This application is a continuation of International Application No. PCT/CN2017/116635, filed on Dec. 15, 2017, the contents of which are incorporated herein by reference.

TECHNICAL FIELD

The present disclosure generally relates to systems and methods for optimizing an online on-demand service, and in particular, to systems and methods for optimizing allocations of drivers to incoming orders in an online on-demand service.

BACKGROUND

On-demand transportation services, especially online car hailing services, have become more and more popular. When a service requester (e.g., a passenger) sends a service request to an online car hailing service platform, the platform may allocate a service provider (e.g., a driver) for the service requester according to artificial rules that intend to make the allocations more efficient and profitable. A problem of the existing technology for allocating service providers to service requesters, however, is that the artificial rules have their limitations in adapting to the development of the services and also sometimes lack accuracy on different business scenarios (e.g., a driver's online and offline behaviors, carpooling orders, reserving orders, upgrading orders, etc.). Accordingly, it is desirable to provide systems and methods for optimizing allocation of drivers to incoming orders to optimize an online on-demand service.

SUMMARY

According to an aspect of the present disclosure, a system may include at least one storage medium including a set of instructions for allocating orders in an online on-demand service, and at least one processor in communication with the storage medium, when executing the set of instructions, the at least one processor may be directed to: obtain order information associated with a plurality of historical orders; obtain driver information associated with a plurality of historical drivers corresponding to the plurality of historical orders; for each historical driver during a predetermined period of time, determine a plurality of records based on the order information and the driver information according to a decision-making processes model; and determine a value function based on the plurality of records of each historical driver according to a reinforcement learning algorithm. In some embodiments, the decision-making processes model is a Markov Decision Process (MDP) model. In some embodiments, each record includes a driver's space-time status, a driver's action, a driver's revenue, and a driver's subsequent space-time status.

In some embodiments, the reinforcement learning algorithm is a temporal-difference learning algorithm.

In some embodiments, the reinforcement learning algorithm is a dynamic programming algorithm.

In some embodiments, for each historical driver during the predetermined period of time, to determine the plurality of records, the at least one processor is further directed to: determine one or more order records, each corresponding to a historical order; and determine one or more spare-time records, each corresponding to a period of idle time not associated with any historical order.

In some embodiments, for each historical driver during the predetermined period of time, to determine the plurality of records, the at least one processor is further directed to: determine one or more order records, each corresponding to a historical order; and obtain an online time point and an offline time point of the historical driver in the predetermined period of time based on the driver information; determine at least one of spare-time records that corresponds to a period of idle time between the online time point and a time point for accepting a first historical order; and determine at least another one of spare-time records that corresponds to a period of idle time between a time point for finishing a last historical order and the offline time point.

In some embodiments, the plurality of records may include at least one order record and at least one spare-time record, an order record corresponds to a historical order and includes at least one of: a driver's space-time status including a time and a location of the historical driver when accepting the historical order, a driver's action including accepting the historical order, a driver's revenue including a value of the historical order, and a driver's subsequent space-time status including a time and a location of the historical driver when finishing the historical order; or a spare-time record corresponds to a period of idle time not associated with any historical order and includes at least one of: a driver's space-time status including a time and a location of the historical driver during the period of idle time, a driver's action including being idle during the period of idle time, a driver's revenue including zero, or a driver's subsequent space-time status including a subsequent time and a subsequent location of the historical driver at the end of the period of idle time. In some embodiments, the period of idle time is a predetermined duration in the idle time.

In some embodiments, for each historical driver during the predetermined period of time, to determine the plurality of records, the at least one processor is further directed to: identify an order type of a subsequent order based on the order information; in response to identifying that the subsequent order is a reserving order, determine a reference time point before a preset buffer time from a start time point of the reserving order; and determine at least one spare-time record that corresponds to a period of idle time between a time point for finishing the historical order and the reference time point.

In some embodiments, for each historical driver during the predetermined period of time, to determine the plurality of records, the at least one processor is further directed to: identify a service type of the historical driver; identify an order type of a subsequent order based on the order information; in response to identifying that the subsequent order is an upgrade order for the historical driver, identify a start time point for the historical driver to receive a normal order associated with the same service type; and determine at least one spare-time record that corresponds to a period of idle time between finishing the historical order and the start time point.

In some embodiments, for each historical driver during the predetermined period of time, to determine the plurality of records, the at least one processor is further directed to: the order record that corresponds to the historical order, the historical order is a general carpooling order that combines a plurality of carpooling orders having a same route ID, the time and the location of the historical driver are respectively a time and a location of the historical driver when first accepting the general carpooling order, and the value of the historical order is a sum of values of the carpooling orders.

In some embodiments, when executing the set of instructions, the at least one processor is further directed to: optimize allocations of drivers to incoming orders based on the value function.

According to another aspect of the present disclosure, a method for allocating orders in an online on-demand service may be implemented on a computing device having at least one processor, at least one storage medium, and a communication platform connected to a network. The method may include one or more following operations: obtaining driver information associated with a plurality of historical drivers corresponding to the plurality of historical orders; for each historical driver during a predetermined period of time, determining a plurality of records based on the order information and the driver information according to a decision-making processes model; and determining a value function based on the plurality of records of each historical driver according to a reinforcement learning algorithm. In some embodiments, the decision-making processes model is a Markov Decision Process (MDP) model. In some embodiments, each record includes a driver's space-time status, a driver's action, a driver's revenue, and a driver's subsequent space-time status.

In some embodiments, the reinforcement learning algorithm is a temporal-difference learning algorithm.

In some embodiments, the reinforcement learning algorithm is a dynamic programming algorithm.

In some embodiments, for each historical driver during the predetermined period of time, the determining the plurality of records may include one or more following operations: determining one or more order records, each corresponding to a historical order; and determining one or more spare-time records, each corresponding to a period of idle time not associated with any historical order.

In some embodiments, for each historical driver during the predetermined period of time, the determining the plurality of records may include one or more following operations: determining one or more order records, each corresponding to a historical order; and obtaining an online time point and an offline time point of the historical driver in the predetermined period of time based on the driver information; determining at least one of spare-time records that corresponds to a period of idle time between the online time point and a time point for accepting a first historical order; and determining at least another one of spare-time records that corresponds to a period of idle time between a time point for finishing a last historical order and the offline time point.

In some embodiments, the plurality of records may include at least one order record and at least one spare-time record, an order record corresponds to a historical order and may include at least one of: a driver's space-time status including a time and a location of the historical driver when accepting the historical order, a driver's action including accepting the historical order and servicing (driving) the historical order, a driver's revenue including a value of the historical order, or a driver's subsequent space-time status including a time and a location of the historical driver when finishing the historical order; and a spare-time record corresponds to a period of idle time not associated with any historical order and may include at least one of: a driver's space-time status including a time and a location of the historical driver during the period of idle time, a driver's action including being idle during the period of idle time, a driver's revenue including zero, or a driver's subsequent space-time status including a subsequent time and a subsequent location of the historical driver at the end of the period of idle time. In some embodiments, the period of idle time is a predetermined duration in the idle time.

In some embodiments, for each historical driver during the predetermined period of time, the determining the plurality of records may include one or more following operations: identifying an order type of a subsequent order based on the order information; in response to identifying that the subsequent order is a reserving order, determining a reference time point before a preset buffer time from a start time point of the reserving order; and determining at least one spare-time record that corresponds to a period of idle time between a time point for finishing the historical order and the reference time point.

In some embodiments, for each historical driver during the predetermined period of time, the determining the plurality of records may include one or more following operations: identifying a service type of the historical driver; identifying an order type of a subsequent order based on the order information; in response to identifying that the subsequent order is an upgrade order for the historical driver, identifying a start time point for the historical driver to receive a normal order associated with the same service type; and determining at least one spare-time record that corresponds to a period of idle time between finishing the historical order and the start time point.

In some embodiments, for each historical driver during the predetermined period of time, the determining the plurality of records may include one or more following operations: determining the order record that corresponds to the historical order, the historical order is a general carpooling order that combines a plurality of carpooling order having a same route ID, the time and the location of the historical driver are respectively a time and a location of the historical drive when first accepting the general carpooling order, and the value of the historical order is a sum of values of the carpooling orders.

According to still another aspect of the present disclosure, a non-transitory computer readable medium, comprising at least one set of instructions for allocating orders in an online on-demand service, when executed by at least one processor of a computer device, the at least one set of instructions directs the at least one processor to: obtain order information associated with a plurality of historical orders; obtain driver information associated with a plurality of historical drivers corresponding to the plurality of historical orders; for each historical driver during a predetermined period of time, determine a plurality of records based on the order information and the driver information according to a decision making processes (e.g., MDP) model, each record includes a driver's space-time status, a driver's action, a driver's revenue, and a driver's subsequent space-time status; and determine a value function based on the plurality of records of each historical driver according to a reinforcement learning algorithm.

BRIEF DESCRIPTION OF THE DRAWINGS

The present disclosure is further described in terms of exemplary embodiments. The foregoing and other aspects of embodiments of present disclosure are made more evident in the following detail description, when read in conjunction with the attached drawing figures.

FIG. 5 is a flowchart illustrating an exemplary process and/or method for optimizing an online on-demand service according to some embodiments of the present disclosure;

FIG. 6-A is schematic diagrams illustrating exemplary status according to some embodiments of the present disclosure;

FIG. 6-B is schematic diagrams illustrating exemplary status according to some embodiments of the present disclosure;

DETAILED DESCRIPTION

Figure 1:
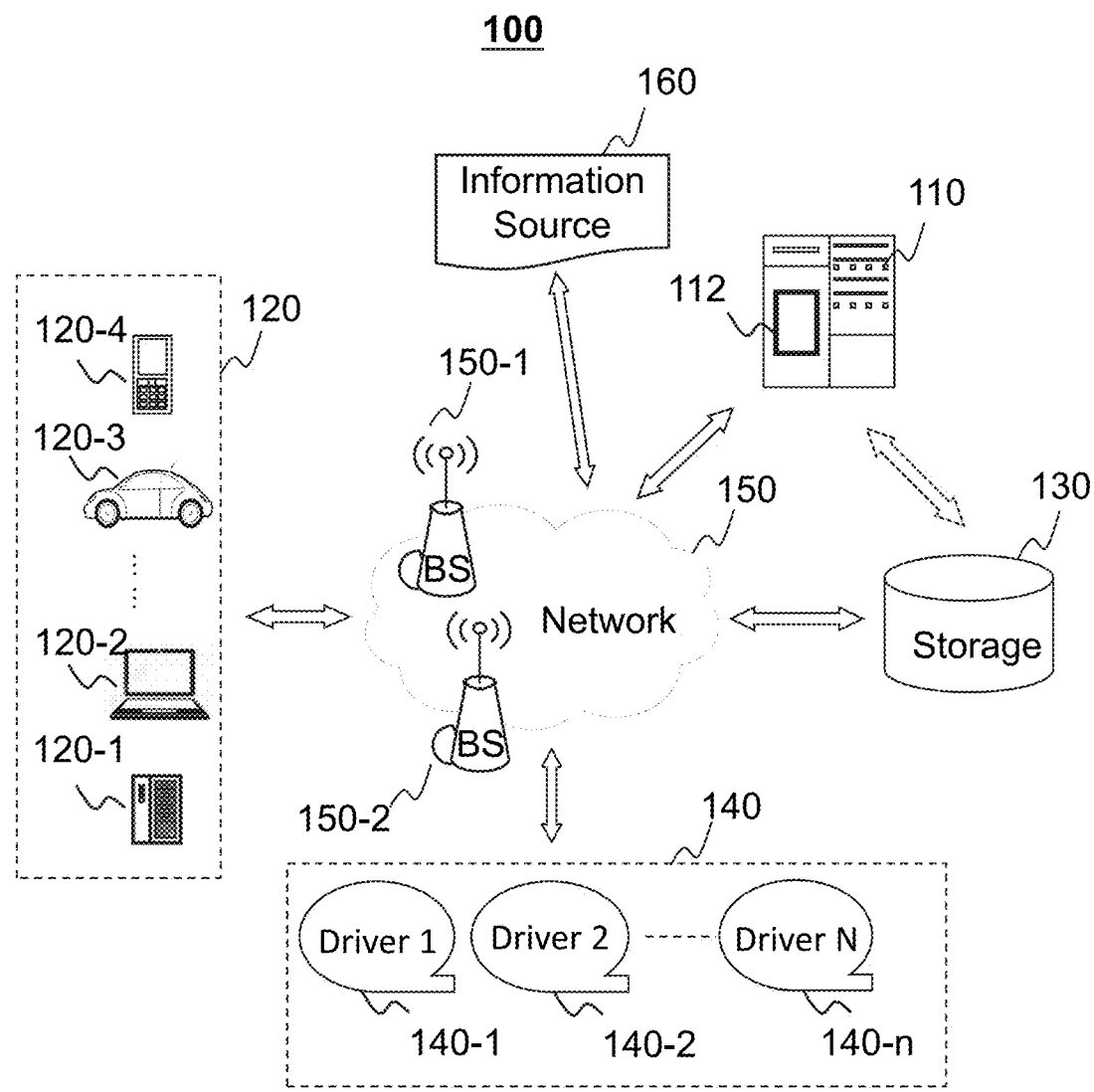
FIG. 1 is a block diagram of an exemplary system for optimizing an online on-demand service according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order or simultaneously. Moreover, one or more other operations may be added to the flowcharts. One or more operations may be removed from the flowcharts.

Moreover, while the system and method in the present disclosure is described primarily in regard to online car hailing services, it should also be understood that this is only one exemplary embodiment. The system or method of the present disclosure may be applied to any other kind of on-demand service. For example, the system or method of the present disclosure may be applied to different transportation systems including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system that applies management and/or distribution, for example, a system for sending and/or receiving an express. The application scenarios of the system or method of the present disclosure may include a webpage, a plug-in of a browser, a client terminal, a custom system, an internal analysis system, an artificial intelligence robot, or the like, or any combination thereof.

The position and/or trace in the present disclosure may be acquired by positioning technology embedded in a user terminal (e.g., a passenger terminal, a driver terminal). The positioning technology used in the present disclosure may include a global positioning system (GPS), a global navigation satellite system (GLONASS), a compass navigation system (COMPASS), a Galileo positioning system, a quasi-zenith satellite system (QZSS), a wireless fidelity (Wi-Fi) positioning technology, or the like, or any combination thereof. One or more of the above positioning technologies may be used interchangeably in the present disclosure.

An aspect of the present disclosure relates to online systems and methods for optimizing an on-demand service. According to the present disclosure, the systems and methods may define a plurality of elements (e.g., a status including a time and a location of a historical driver, an action of the historical driver, a revenue that the historical driver obtained under the status, a subsequent status including a subsequent time and a subsequent location of the historical driver, etc.) according to a decision making processes (e.g., MDP) model, and input the plurality of elements into a reinforcement learning algorithm (e.g., a temporal-difference learning algorithm, a dynamic programming algorithm) to obtain a value function. The systems and methods may allocate drivers for passengers based on the value function to optimize allocation of drivers to orders in the online on-demand service. According to the present disclosure, the systems and methods may define the plurality of elements according to different business scenarios (e.g., the historical drivers' online and offline behaviors, carpooling orders, reserving orders, upgrade orders, etc.), and determine a value function based on the plurality of elements associated with different business scenarios.

FIG. 1 is a block diagram of an exemplary system 100 for allocating orders in an online on-demand service according to some embodiments of the present disclosure. For example, the system 100 may be an online transportation service platform for transportation services such as car hailing services, chauffeur services, vehicle delivery services, carpooling services, bus services, driver hiring services, and shuttle services, etc. The system 100 may include a server 110, a passenger terminal 120, a storage 130, a driver terminal 140, a network 150 and an information source 160. The server 110 may include a processing engine 112.

The server 110 may be configured to process information and/or data relating to an online on-demand service, for example, allocations of drivers to orders. For example, the server 110 may determine a value function for an allocation method, and allocate each order to a corresponding driver terminal 140 according to the allocation method. In some embodiments, the server 110 may be a single server, or a server group. The server group may be centralized, or distributed (e.g., the server 110 may be a distributed system). In some embodiments, the server 110 may be local or remote. For example, the server 110 may access information and/or data stored in the passenger terminal 120, the driver terminal 140 and/or the storage 130 via the network 150. As another example, the server 110 may be directly connected to the passenger terminal 120, the driver terminal 140 and/or the storage 130 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device having one or more components illustrated in FIG. 2 in the present disclosure.

In some embodiments, the server 110 may include a processing engine 112. The processing engine 112 may process information and/or data relating to an online on-demand service, for example, allocations of drivers to orders. For example, the processing engine 112 may determine a value function for an allocation method, and allocate each order to a corresponding driver terminal 140 according to the allocation method. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiments, the passenger terminal 120 and/or the driver terminal 140 may be an individual, a tool or other entity directly relating to the orders. A passenger may be a service requester. In the present disclosure, "service requester", "passenger terminal" and "passenger" may be used interchangeably. A driver may be a service provider. In the present disclosure, "driver," "driver terminal", and "service provider" may be used interchangeably. In some embodiments, the passenger terminal 120 may include a mobile device 120-1, a tablet computer 120-2, a laptop computer 120-3, and a built-in device 120-4 in a motor vehicle, or the like, or any combination thereof. In some embodiments, the mobile device 120-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a HoloLens, a Gear VR, etc. In some embodiments, built-in device in the motor vehicle 120-4 may include an onboard computer, an onboard television, etc. In some embodiments, the passenger terminal 120 may be a device with positioning technology for locating the position of the user and/or the passenger terminal 120.

In some embodiments, the driver terminal 140 may be similar to, or the same device as the passenger terminal 120. In some embodiments, the driver terminal 140 may be a device with positioning technology for locating the position of the driver and/or the driver terminal 140. In some embodiments, the passenger terminal 120 and/or the driver terminal 140 may communicate with another positioning device to determine the position of the user, the passenger terminal 120, the driver, and/or the driver terminal 140. In some embodiments, the passenger terminal 120 and/or the driver terminal 140 may transmit positioning information to the server 110.

The storage 130 may store data and/or instructions related to the orders. In some embodiments, the storage 130 may store data obtained/acquired from the passenger terminal 120 and/or the driver terminal 140. In some embodiments, the storage 130 may store data and/or instructions that the server 110 may execute or use to perform exemplary methods described in the present disclosure. In some embodiments, the storage device 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 130 may be connected to the network 150 to communicate with one or more components in the system 100 (e.g., the server 110, the passenger terminal 120, the driver terminal 140). One or more components in the system 100 may access the data or instructions stored in the storage 130 via the network 150. In some embodiments, the storage 130 may be directly connected to or communicate with one or more components in the system 100 (e.g., the server 110, the passenger terminal 120, the driver terminal 140, etc.). In some embodiments, the storage 130 may be part of the server 110.

The network 150 may facilitate exchange of information and/or data. In some embodiments, one or more components in the system 100 (e.g., the server 110, the passenger terminal 120, the storage 130, and the driver terminal 140) may send and/or receive information and/or data to/from other component(s) in the system 100 via the network 150. For example, the server 110 may obtain/acquire orders from the passenger terminals 120 via the network 150. In some embodiments, the network 150 may be any type of wired or wireless network, or combination thereof. Merely by way of example, the network 150 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, a global system for mobile communications (GSM) network, a code-division multiple access (CDMA) network, a time-division multiple access (TDMA) network, a general packet radio service (GPRS) network, an enhanced data rate for GSM evolution (EDGE) network, a wideband code division multiple access (WCDMA) network, a high speed downlink packet access (HSDPA) network, a long term evolution (LTE) network, a user datagram protocol (UDP) network, a transmission control protocol/Internet protocol (TCP/IP) network, a short message service (SMS) network, a wireless application protocol (WAP) network, a ultra wide band (UWB) network, an infrared ray, or the like, or any combination thereof. In some embodiments, the system 100 may include one or more network access points. For example, the system 110 may include wired or wireless network access points such as base stations and/or wireless access points 150-1, 150-2, . . . , through which one or more components of the system 100 may be connected to the network 150 to exchange data and/or information.

The information source 160 may be a source configured to provide other information for the system 100. The information source 160 may provide the system 100 with service information, such as weather conditions, traffic information, information of laws and regulations, news events, life information, life guide information, or the like. The information source 160 may be implemented in a single central server, multiple servers connected via a communication link, or multiple personal devices. When the information source 160 is implemented in multiple personal devices, the personal devices can generate content (e.g., as referred to as a "user-generated content"), for example, by uploading text, voice, image, and video to a cloud server. An information source may be generated by the multiple personal devices and the cloud server.

Figure 2:
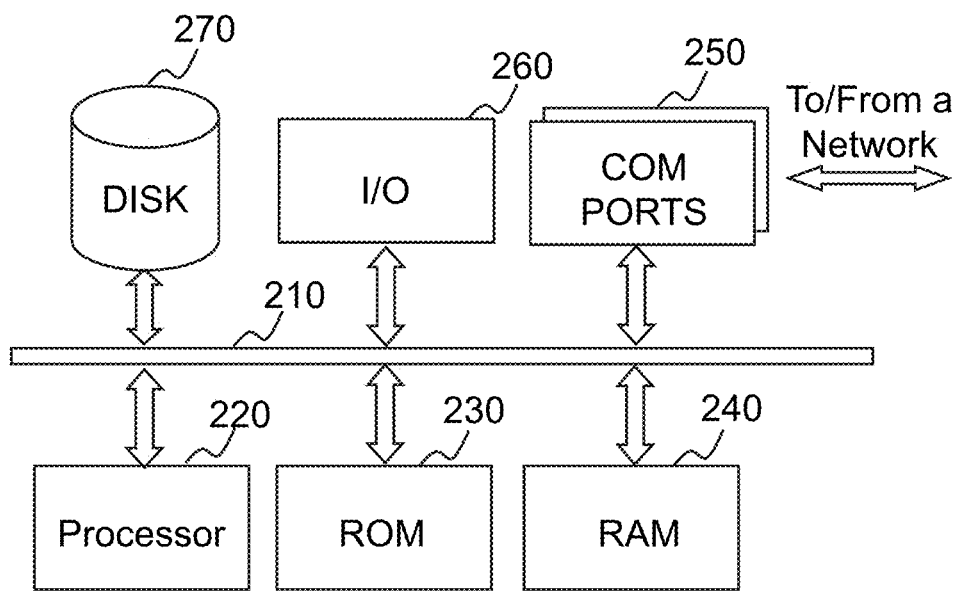
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 on which the server 110, the passenger terminal 120, the storage 130, the driver 140 and/or the information source 160 may be implemented according to some embodiments of the present disclosure. The particular system may use a functional block diagram to explain the hardware platform containing one or more user interfaces. The computer may be a computer with general or specific functions. Both types of the computers may be configured to implement any particular system according to some embodiments of the present disclosure. Computing device 200 may be configured to implement any components that perform one or more functions disclosed in the present disclosure. For example, the computing device 200 may implement any component of the system 100 as described herein. In FIGS. 1-2, only one such computer device is shown purely for convenience purposes. One of ordinary skill in the art would understand at the time of filing of this application that the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The exemplary computing device may include the internal communication bus 210, program storage and data storage of different forms including, for example, a disk 270, and a read only memory (ROM) 230, or a random access memory (RAM) 240, for various data files to be processed and/or transmitted by the computing device. The exemplary computing device may also include program instructions stored in the ROM 230, RAM 240, and/or other type of non-transitory storage medium to be executed by the processor 220. The methods and/or processes of the present disclosure may be implemented as the program instructions. The computing device 200 also includes an I/O component 260, supporting input/output between the computer and other components. The computing device 200 may also receive programming and data via network communications.

Merely for illustration, only one CPU and/or processor is illustrated in FIG. 2. Multiple CPUs and/or processors are also contemplated; thus operations and/or method steps performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
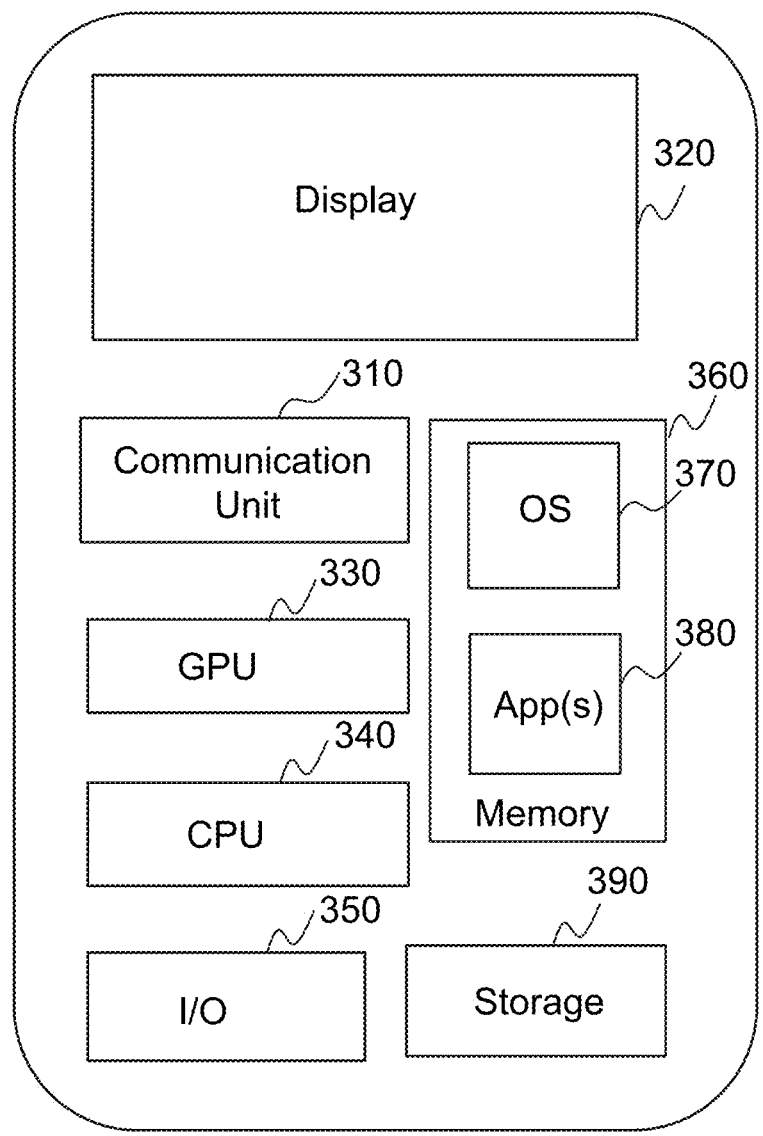
FIG. 3 is a schematic diagram illustrating exemplary hardware and/or software components of a mobile device according to some embodiments of the present disclosure.

FIG. 3 is a schematic diagram illustrating exemplary hardware and/or software components of an exemplary mobile device 300 on which the passenger terminal 120 or the provider terminal 140 may be implemented according to some embodiments of the present disclosure. As illustrated in FIG. 3, the mobile device 300 may include a communication unit 310, a display 320, a graphic processing unit (GPU) 330, a central processing unit (CPU) 340, an I/O 350, a memory 360, and a storage 390. The CPU 340 may include interface circuits and processing circuits similar to the processor 220. In some embodiments, any other suitable component, including but not limited to a system bus or a controller (not shown), may also be included in the mobile device 300. In some embodiments, a mobile operating system 370 (e.g., iOS™, ANDROID™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to a service request or other information from the location based service providing system on the mobile device 300. User interactions with the information stream may be achieved via the I/O devices 350 and provided to the processing engine 112 and/or other components of the system 100 via the network 120.

In order to implement various modules, units and their functions described above, a computer hardware platform may be used as hardware platforms of one or more elements (e.g., a module of the sever 110 described in FIG. 2). Since these hardware elements, operating systems, and program languages are common, it may be assumed that persons skilled in the art may be familiar with these techniques and they may be able to provide information required in the route planning according to the techniques described in the present disclosure. A computer with user interface may be used as a personal computer (PC), or other types of workstations or terminal devices. After being properly programmed, a computer with user interface may be used as a server. It may be considered that those skilled in the art may also be familiar with such structures, programs, or general operations of this type of computer device. Thus, extra explanations are not described for the figures.

Figure 4:
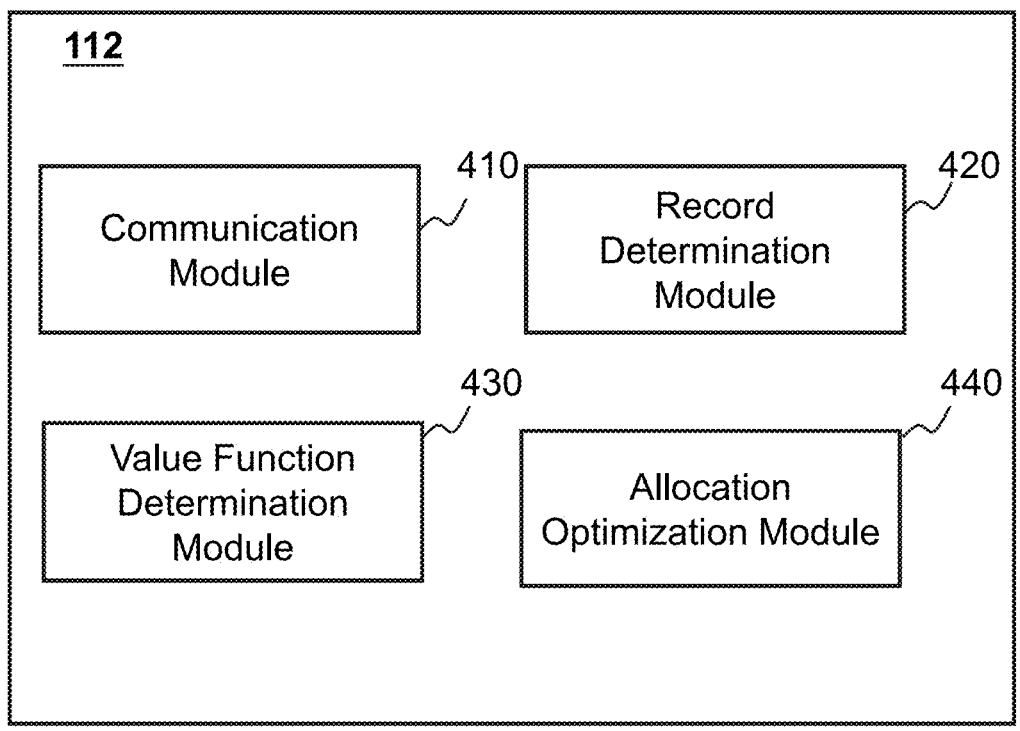
FIG. 4 is a block diagram illustrating an exemplary processing engine according to some embodiments of the present disclosure.

FIG. 4 is a block diagram illustrating an exemplary processing engine 112 according to some embodiments of the present invention. In some embodiments, the processing engine 112 may include a communication module 410, a record determination module 420, a value function determination module 430, and an allocation optimization module 440. Each, part, or all of the modules may be hardware circuits of all or part of the processing engine 112. Each, part, or all of the modules may also be implemented as an application or a set of instructions that can be read and executed by the processing engine. Further, the modules may be any combination of the hardware circuits and the application/instructions. For example, the modules may be the part of the processing engine 112 when the processing engine is executing the application/set of instructions.

The communication module 410 may be configured to obtain information associated with the online on-demand service. For example, the communication module 410 may be configured to obtain order information associated with one or a plurality of historical orders. As another example, the communication module 410 may be configured to obtain driver information associated with one or a plurality of historical drivers corresponding to the one or plurality of historical orders. For illustration purposes, the descriptions would refer to "a plurality of historical orders" and "a plurality of historical drivers" as examples. It should be noted that in some embodiments, order information associated with only one historical driver or driver information associated with only one historical order is obtained.

The term "order information" in the present disclosure may refer to a combination of information and/or features associated with one or a plurality of historical orders. For example, the order information of a historical order may include a historical order number, a historical order start location, a historical order destination, a historical order start time, a historical order end time, a passenger that initiated the historical order, a historical driver that completed the historical order, a driver type of the historical driver, an order type of the historical order, an order value of the historical order, or the like, or any combination thereof. The term "historical order" in the present disclosure may refer to an order that was made by a service requester through the online on-demand service platform and was completed by a service provider in the past.

The term "driver information" in the present disclosure may refer to a combination of information and/or features associated with one or a plurality of historical drivers. For example, the driver information of a historical driver may include at least one space-time status (including a location and a corresponding time) of the historical driver, at least one action that the historical driver took (e.g., accepting an historical order, being idle during a period of idle time, etc.), at least one subsequent space-time status (including a subsequent location and a corresponding subsequent time) of the historical driver, a driver identification (e.g., a registration number of the driver), a vehicle type of a vehicle owned by the driver, a vehicle identification (e.g., a plate number of the vehicle), a driver profile (e.g., a service score of the driver), or the like, or any combination thereof. The term "historical driver" in the present disclosure may refer to a service provider who registered on the platform and provided service(s) in the past.

The record determination module 420 may be configured to determine a plurality records. In some embodiments, for each historical driver during a predetermined period of time, the record determination module 420 may be configured to determine a plurality of records based on the order information and driver information obtained from the communication module 410 according to a decision-making processes model, such as but not limited to a Markov Decision Process (MDP) model. For example, the record determination module 420 may be configured to determine one or more order records and one or more spare-time records. Each order record may correspond to a historical order, and each spare-time record may correspond to a period of idle time not associated with any historical order. As another example, the record determination module 420 may be configured to determine at least one spare-time record that corresponds to a period of idle time based on an online time point and an offline time point of the historical driver. As still another example, the record determination module 420 may be configured to identify that a subsequent order is a reserving order (or an upgrade order), and determine at least one spare-time record that corresponds to a period of idle time based on the reserving order (or the upgrade order). As still another example, the record determination module 420 may be configured to determine an order record based on a general carpooling order that combines a plurality of carpooling orders having a same route ID.

In some embodiments, the plurality of records may include at least one order record and/or at least one spare-time record. In some embodiments, an order record may correspond to a historical order that was accepted and completed by a historical driver. The order record may include one or more elements associated with the historical order and the historical driver corresponding to the historical order. For example, the order record may include a driver's space-time status including a time and a location of the historical driver when accepting the historical order, a driver's action including accepting the historical order and servicing (driving) the historical order, a driver's revenue including the value of the historical order, a driver's subsequent space-time status including a time and a location of the historical driver when finishing the historical order, or the like, or any combination thereof. In some embodiments, a spare-time record may correspond a period of idle time not associated with any historical order. The order record may include at least one element associated with a period of idle time and a historical driver corresponding to the period of idle time. For example, the spare-time record may include a driver's space-time status including a time and a location of the historical driver during the period of idle time, a driver's action including being idle during the period of idle time, a driver's revenue including zero, a driver's subsequent space-time status including a subsequent time and a subsequent location of the historical driver at the end of the period of idle time, or the like, or any combination thereof.

The value function determination module 430 may be configured to determine a value function. For example, value function determination module 430 may be configured to determine a value function based on the determined plurality of records of each historical driver according to a reinforcement learning algorithm. A more detailed description of the actions of the value function determination module 430 is provided in the descriptions associated with FIG. 5.

The allocation optimization module 440 may be configured to optimize allocations of drivers to incoming orders in the online on-demand service. For example, the allocation optimization module 440 may be configured to optimize allocations of drivers to incoming orders based on the value function determined by the value function determination module 430. A more detailed description of the actions of the allocation optimization module 440 is provided in the descriptions associated with FIG. 5.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth™, a ZigBee™, a Near Field Communication (NFC), or the like, or any combination thereof. Two or more of the modules may be combined as a single module, and any one of the modules may be divided into two or more units. For example, the record determination module 420 may be integrated into the value function determination module 440 as a single module that may both determine the plurality of records and the value function. As another example, the communication module 410 may be divided into two units: an order information obtaining unit and a driver information obtaining unit, which work together to implement the functions of the communication module 420, respectively. It should be noted that FIG. 4 only illustrates four modules in the processing engine 112, the processing engine 112 may further include one or more other modules. For example, the processing engine may further include an incoming order obtaining module for obtaining at least one incoming order, and an order allocation module for allocating a driver for each of the at least one incoming order.

FIG. 5 is a flowchart of an exemplary process and/or method 500 for optimizing an online on-demand service according to some embodiments of the present disclose. In some embodiments, one or more steps in the process 500 may be implemented in the system 100 illustrated in FIG. 1. For example, one or more steps in the process 500 may be stored in the storage (e.g., the storage 130, the ROM 230, the RAM 240, etc.) as a form of instructions, and invoked and/or executed by the server 110 (e.g., the processing engine 112 in the server 110, or the processor 220 of the processing engine 112 in the server 110).

In 510, the processor 220 (or the communication module 410) may obtain order information associated with a plurality of historical orders.

The term "historical order" in the present disclosure may refer to an order that requested by a service requester and has completed by a service provider on the online on-demand service platform in the past. The term "order information" in the present disclosure may refer to a combination of information and/or feature associated with one or a plurality of historical orders. For example, the order information associated with a historical order may include a historical order number, a historical order start location, a historical order destination, a historical order start time, a historical order end time, a passenger that initiated the historical order, a historical driver that completed the historical order, a driver type of the historical driver, an order type of the historical order, an order value of the historical order, or the like, or any combination thereof.

In some embodiments, once an order is completed, the order is referred to as a historical order. The passenger terminal 120 that requested the historical order and/or the driver terminal 140 that completed the historical order may send the order information to a storage medium (e.g., the storage 130, the ROM 230, the RAM 240, etc.) of the system 100 via the network 150. The processor 220 may obtain the order information from the storage medium of the system 100.

In some embodiments, the plurality of historical orders may include at least one historical order that was completed in a predetermined period of time (e.g. 1 day, 2 days, 3 days, 5 days, 7 days, 1 month, 3 months, 6 month, 1 year, 2 years, 3 years, 5 years, etc.) in the past. For example, the processor 220 may obtain order information associated with at least one historical order that was completed in the past year, in the past month, in the past day, in the past hour, or the like, or any combination thereof. In some embodiments, the plurality of historical orders may include a predetermined number of historical orders (e.g., 1 million orders, 100,000 orders, 10,000 orders, 1,000 order, 100 orders, 50 orders, 10 orders, 5 orders, 1 order, etc.) that was completed in a recent period of time in the past.

In 520, the processor 220 (or the communication module 410) may obtain driver information associated with a plurality of historical drivers corresponding to the plurality of historical orders.

The term "historical driver" in the present disclosure may refer to a service provider who registered on the platform and provided service(s) in the past. In some embodiments, a historical driver may correspond to at least one historical order, and a historical order may correspond to only one historical order. For example, a historical driver may have completed at least one historical order to provide service(s) in the past, and a historical order may be completed by only one historical driver.

The term "driver information" in the present disclosure may refer to a combination of information and/or features associated with one or a plurality of historical drivers. For example, the driver information of a historical driver may include at least one space-time status (including a location and a corresponding time) of the historical driver, at least one action that the historical driver took (e.g., accepting an historical order, being idle during a period of idle time, etc.), at least one subsequent space-time status (including a subsequent location and a corresponding subsequent time) of the historical driver, a driver identification (e.g., a registration number of the driver), a vehicle type of a vehicle owned by the driver, a vehicle identification (e.g., a plate number of the vehicle), a driver profile (e.g., a service score of the driver), or the like, or any combination thereof.

In some embodiments, once a driver registers on the online on-demand platform and/or completes an order, the driver terminal 140 associated with the driver may send the corresponding driver information to a storage medium (e.g., the storage 130, the ROM 230, the RAM 240, etc.) of the system 100 via the network 150. The processor 220 may obtain the driver information from the storage medium of the system 100.

In 530, for each historical driver during a predetermined period of time, the processor 220 (or the record determination module 420) may determine a plurality of records based on the order information and the driver information according to a decision-making processes, such as but not limited to a Markov Decision Process (MDP) model, which is used as an example for illustration purposes. In some embodiments, the processor 220 may go through every historical driver in the plurality of historical drivers to obtain a large number of orders according to the MDP model.

In some embodiments, the predetermined period of time may refer to a predetermined period of time (e.g. 1 day, 2 days, 3 days, 5 days, 7 days, 1 month, 3 months, 6 month, 1 year, 2 years, 3 years, 5 years, etc.) in the past, and be determined according to different application scenarios. For example, the predetermined period of time may be a certain period of time predetermined by the system 100, such as the past year, the past month, the past day, the past hour, etc. In some embodiments, the processor 220 may extract at least one historical order and at least one corresponding historical driver during the predetermined period of time based on the order time (e.g., the order start time, the order end time, etc.). For example, the processor may obtain order information associated with the at least one historical order and driver information associated with the corresponding at least one historical driver to determine the plurality of records for each historical driver, respectively.

In some embodiments, for a historical driver, the processor 220 may input the order information and the corresponding driver information during the predetermined period of time into the MDP model. The MDP model may define the historical driver as an agent, and each record may include four elements <S, A, R, P>. In some embodiments, the four elements may include a driver's space-time status (S), a driver's action (A), a driver's revenue (R), a driver's subsequent space-time status (P), or the like, or any combination thereof. For example, in the MDP model, at each time step, a process (here refers to as providing services on the online on-demand platform) is in a state S, and the decision maker (here refers to as the historical driver) may choose an action A that is available in the status S. The process responds at the next time by randomly moving into the subsequent status P, and giving the decision maker a corresponding reward R. In some embodiments, the output of the MDP model may include a value function (V(S)). In some embodiments, the value function (V(S)) may refer to an expectation value of an accumulated revenue that the historical driver may obtain under the driver's space-time status (S).

In some embodiments, the driver's space-time status (S) may refer to a situation that the corresponding historical driver is located at a particular time. For example, the driver's space-time status may include a combination of a time and a location. The time may be a time point or a period of time when the historical driver was at the location, and the location may be a position or an area that the historical driver was located at the time point or the period of time. In some embodiments, the location may include a location name, an area name, coordinates of the location, or the like, or any combination thereof.

In some embodiments, the driver's action (A) may refer to an action that the corresponding historical driver took under the driver's space-time status. For example, the driver's action may include accepting a historical order, rejecting a historical order, working (driving) under a historical order, finishing a historical order, being idle (neither accepting any historical order nor being in service of any historical order), being offline, or the like, or any combination thereof.

In some embodiments, the driver's revenue (R) may refer to an income that the corresponding historical driver brings in as a result of the driver's action. For example, if a historical driver accepted a historical order, the historical driver would bring in an order value of the historical order. Accordingly, the driver's revenue may be the order value of the historical order. As another example, if the historical driver rejected the historical order (or is idle, is offline), the historical driver would bring in nothing. Accordingly, the driver's revenue may be zero.

In some embodiments, the driver's subsequent space-time status (P) may refer to a situation that the corresponding historical driver is located at a subsequent time of the particular time corresponding to a previous status. For example, the driver's subsequent space-time status may include a combination of a subsequent time and a subsequent location. The subsequent time may be a time point or a period of time when the historical driver was at the subsequent location, and the subsequent location may be a position or an area that the historical driver was located at the subsequent time point or the subsequent period of time. In some embodiments, the subsequent location may include a subsequent location name, a subsequent area name, coordinates of the subsequent location, or the like, or any combination thereof. In some embodiments, the subsequent location may be the same as the location in the driver's space-time status. For example, the historical driver may stay at a same place without moving. In some embodiments, the subsequent location may be different from the location in the driver's space-time status. For example, the historical driver may move to another place at the subsequent time.

In some embodiments, the plurality of records may include different types of records according to different status and/or actions of the historical drivers. For example, the plurality of records may include at least one order record and at least one spare-time record. In some embodiments, an order record may refer to a record that corresponds to a historical order in response that the corresponding historical driver accepted the historical order. For example, an order record may include a driver's space-time status including a time and a location of the historical driver when accepting the historical order, a driver's action including accepting the historical order and servicing (driving) the historical order, a driver's revenue including a value of the historical order, a driver's subsequent space-time status including a time and a location of the historical driver when finishing the historical order, or the like, or any combination thereof. In some embodiments, a spare-time order may refer to an order that corresponds to a period of idle time not associated with any historical order, wherein the corresponding historical driver was idle without accepting any historical order or providing service during any historical order time. For example, a spare-time order may include a driver's space-time status including a time and a location of the historical driver during the period of idle time, a driver's action including being idle during the period of idle time, a driver's revenue including zero, a driver's subsequent space-time status including a subsequent time and a subsequent location of the historical driver at the end of the period of idle time, or the like, or any combination thereof. In some embodiments, the period of idle time may be a predetermined duration in the idle time. In some embodiments, the obtaining of the plurality of orders including one or more order records and/or one or more spare-time record may be described in connection with FIGS. 8-11 and the descriptions thereof in the present disclosure.

In 540, the processor 220 (or the value function determination module 430) may determine a value function based on the plurality of orders of each historical driver according to a reinforcement learning algorithm.

In some embodiments, the value function may refer to a function that represents an expectation value of an accumulated revenue that a historical driver may obtain under a driver's space-time status. In some embodiments, the value function may include an algorithm, a formula, a method, a process, or the like, for determining the expectation value of an accumulated revenue that a historical driver would bring in.

In some embodiments, the reinforcement learning algorithm may include a temporal-difference (TD) learning algorithm, a dynamic programming algorithm, a Monte Carlo (MC) learning algorithm, a SARSA algorithm, a Q-learning algorithm, or the like, or any combination thereof. For illustration purpose, the TD learning algorithm and dynamic programming algorithm are described herein as examples to determine a value function.

In some embodiments, the TD learning algorithm may simulate (or go through) every or several steps during a series of actions. The TD learning algorithm may estimate a value of a previous status before the next status according to a brought-in revenue and the value of the next status. For example, the processor 220 may input the plurality of orders of each historical driver (e.g., <S, A, R, P>) into Formula (1):

$$V(S_t) \leftarrow V(S_t) + \alpha[R_{t+1} + \gamma V(S_{t+1}) - V(S_t)] \qquad (1),$$

wherein t denotes a time point of taking an action, t+1 denotes a subsequent time point of t, $S_t$ denotes a status before taking the action, $R_{t+1}$ denotes a revenue that a historical driver would bring in at t+1, $V(S_t)$ and $V(S_{t+1})$ respectively denotes a value function of the status $S_t$ and the status $S_{t+1}$, γ denotes a decay factor between 0 and 1, and α denotes a learning rate.

In some embodiments, the processor 220 may input the plurality of orders of each historical driver into the Formula (1) until a convergence of the Formula (1). Then the processor 220 may determine the value function (V(s)). It should be noted that the Formula (1) is only one step of TD learning algorithm, other formulas that include a plurality of step may be used for determining the value function.

FIG. 6-A and FIG. 6-B are schematic diagrams illustrating exemplary status according to some embodiments of the present disclosure. As shown in FIG. 6-A, a historical driver is at location X at time point $T_0$ (also referred to as status $S_0$) and at location X at a sequent time point $T_1$ (also referred to as status $S_1$), which, in combination with other information, indicates that during the period of time from $T_0$ to $T_1$, the historical driver is idle and not associated with any historical order. The processor 220 may input the corresponding records associated with status $S_0$ and $S_1$ into the Formula (1) to determine the value function of $S_0$ as Formula (2):

$$V(S_0) \leftarrow V(S_t) + \alpha[R_{t+1} + \gamma V(S_{t+1}) - V(S_0)] \qquad (2),$$

wherein a revenue that the historical driver brought in at t+1 is 0.

As shown in FIG. 6-B, a historical driver is at location X at time point $T_0$ (also referred to as status $S_0$) and at location Y at a sequent time point $T_2$ (also referred to as status $S_2$), which, in combination with other information, indicates that during the period of time from $T_0$ to $T_2$, the historical driver accepted a historical order. The processor 220 may input the corresponding records associated with status $S_0$ and $S_2$ into the Formula (3) to determine the value function of $S_0$:

$$V(S_0) \leftarrow V(S_0) + \alpha[R + \gamma^3 V(S_2) - V(S_0)] \qquad (3),$$

wherein a revenue that the historical driver brings in at t+2 is R.

Figure 7:
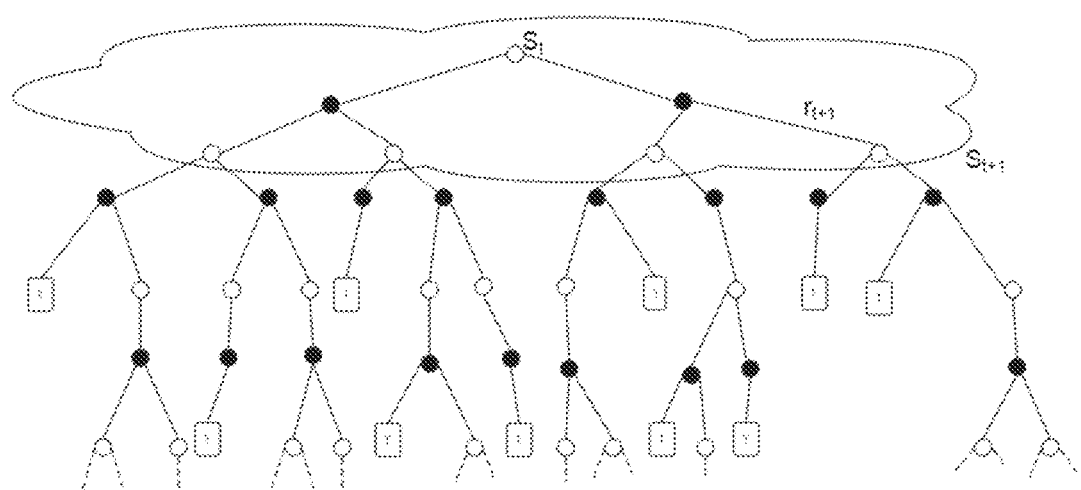
FIG. 7 is a schematic diagram illustrating an exemplary process of a dynamic programming algorithm according to some embodiments of the present disclosure.

FIG. 7 is a schematic diagram illustrating an exemplary process of a dynamic programming algorithm according to some embodiments of the present disclose. As shown in FIG. 7, the dynamic programming algorithm may start at a status St, and go through every possible status to determine the value function.

In some embodiments, the dynamic programming algorithm may turn a multi-stage process into a single-stage process. The dynamic programming algorithm may solve the value function one by one according to relationships of each stage. For example, the dynamic programming algorithm may simulate status transition probability based on the plurality of orders of each historical driver. For example, the processor 220 may input the plurality of orders of each historical driver into Formula (4) to determine a value function of any location at every time point from back forward on the timeline:

$$V_{k+1}(S) = E_\pi[R_{t+1} + \gamma V_k(S_{t+1})|S_t = S] \qquad (4),$$

wherein t denotes a time point of taking an action, t+1 denotes a subsequent time point of t, $S_t$ denotes a status before taking the action, $R_{t+1}$ denotes a revenue that a historical driver brings in at t+1, $V(S_t)$ and $V(S_{t+1})$ respectively denotes a value function of the status $S_t$ and the status $S_{t+1}$, γ denotes a decay factor between 0 and 1, and $E_\pi$ denotes a mathematical expectation.

In 550, the processor 220 (or the allocation optimization module 440) may optimize allocations of drivers to incoming orders based on the value function.

In some embodiments, the incoming orders may refer to at least one order that the system 100 obtains at a current time. The processor 220 may determine an allocation strategy and/or method based on the value function, and allocate each order in the incoming orders to a driver based on the allocation strategy and/or method. For example, the processor 220 may determine an estimated value that a driver may bring in if he/she is allocated each order of the incoming orders, and allocate an order corresponding to a higher estimated value to a certain driver (e.g., a driver with a higher service score).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step, a preprocessing step) may be added elsewhere in the exemplary process/method 500. As another example, all the steps in the exemplary process/method 500 may be implemented in a computer-readable medium including a set of instructions. The instructions may be transmitted in a form of electronic current or electrical signals.

Figure 8:
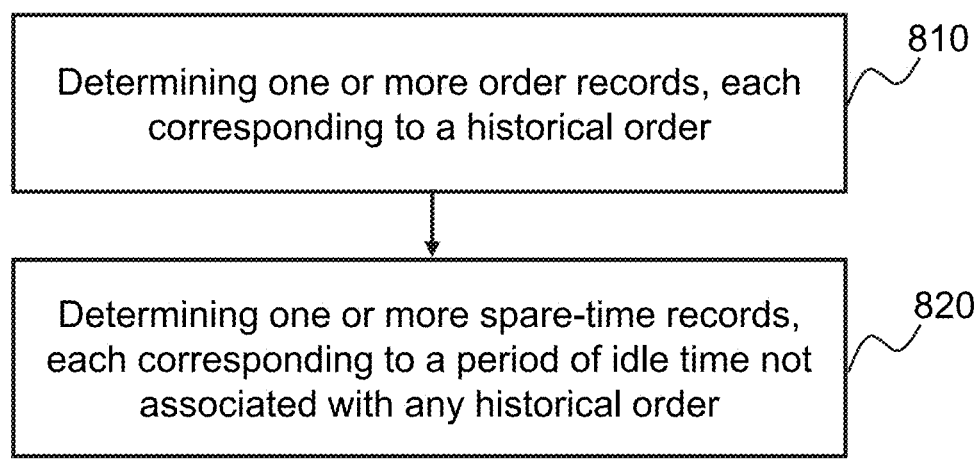
FIG. 8 is a flowchart illustrating an exemplary process and/or method for obtaining a plurality of records according to some embodiments of the present disclosure.

FIG. 8 is a flowchart of an exemplary process and/or method 800 for obtaining a plurality of records according to some embodiments of the present disclose. In some embodiments, one or more steps in the process 800 may be implemented in the system 100 illustrated in FIG. 1. For example, one or more steps in the process 800 may be stored in the storage 130 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110).

In some embodiments, the processor 220 may implement the process and/or method 800 for obtaining the plurality of records in the descriptions of FIG. 5. For example, the processor 220 may implement the process and/or method 800 for demining one or more order records and/or one or more spare-time records according to a decision-making processes model (e.g., a MDP model), so as to obtain the plurality of records including one or more order records and/or one or more spare-time records. In some embodiments, the one or more order records and/or one or more spare-time records determined in the process and/or method 800 may be used to determine a value function according to a reinforcement learning algorithm in the descriptions of FIG. 5.

In 810, the processor 220 (or the record determination module 420) may determine one or more order records. In some embodiments, each order record may correspond to a historical order. In some embodiments, during the predetermined period of time, for each driver, the processor may determine an order record corresponding to each historical order.

In some embodiments, an order record may refer to a record that corresponds to a historical order in which that the corresponding historical driver accepted the historical order. In some embodiments, an order record may include a driver's space-time status including a time and a location of the historical driver when accepting the historical order, a driver's action including accepting the historical order and servicing (driving) the historical order, a driver's revenue including a value of the historical order, a driver's subsequent space-time status including a time and a location of the historical driver when finishing the historical order, or the like, or any combination thereof.

In some embodiments, the historical order is a general carpooling order. The general carpooling order may refer to an order that combines a plurality of carpooling orders having a same route ID, before or after the routes of the carpooling orders are processed and optimized. Each carpooling order may correspond to a service request. In some embodiments, the route ID may refer to an identification of a driving route. The processor 220 may assign a route ID for each carpooling order. For example, the carpooling orders that can be finished by a same driver at a same period of time, and have at least a part of same driving route may be assigned to a same route ID. The carpooling orders having the same route ID may be included in a general carpooling order, which is assigned to a driver. In some embodiments, the processor 220 may generate an order record that corresponds to the general carpooling order. The order record may include a driver's space-time status including a time and a location of the historical driver when first accepting the general carpooling order, a driver's action including accepting the general carpooling order and servicing (driving) the general carpooling order, a driver's revenue including a sum of values of the carpooling orders, a driver's subsequent space-time status including a time and a location of the historical driver when last finishing the general carpooling order, or the like, or any combination thereof. In some embodiments, the time and the location of the historical driver when first accepting the general carpooling order may refer to a time and a location of a carpooling order from the carpooling orders with the same route ID that started earliest among the carpooling orders. The sum of values of the carpooling orders may refer to a sum of order values of the carpooling orders with the same route ID. In some embodiments, the value of each carpooling orders may refer to a value that is displayed to a user and refer to a value that the user may pay for each carpooling order. The time and the location of the historical driver when finishing the general carpooling order may refer to a time and a location of a carpooling order from the carpooling orders with the same route ID that ended latest among the carpooling orders.

In 820, the processor 220 (or the record determination module 420) may determine one or more spare-time records. In some embodiments, each spare-time order may correspond to a period of idle time not associated with any historical order.

In some embodiments, the period of idle time may be determined according to different application scenarios. For example, the period of idle time may be different according to different time, different areas, or the like, or any combination thereof. As another example, the period of idle time may be a certain period of time determined by the system 100, such as 10 minutes, 20 minutes, 45 minutes, etc. Merely by way of example, the processor 220 may generate a spare-time record every 10 minutes. A historical driver D was idle from 8:00 to 8:20, and accepted a historical order at 8:23. The processor may generate two spare-time records between 8:00 to 8:30: Record 1 from 8:00 to 8:10, started from Location A, to 8:10 to 8:20, ended at Location A, Revenue is 0; and Record 2 from 8:10 to 8:20, started from Location A, to 8:20 to 8:30, ended at Location A, Revenue is 0.

In some embodiments, a spare-time order may refer to a record that corresponds to a period of idle time not associated with any historical order in response that the corresponding historical driver was idle without accepting any historical order nor servicing any historical order. In some embodiments, a spare-time order may include a driver's space-time status including a time and a location of the historical driver during the period of idle time, a driver's action including being idle during the period of idle time, a driver's revenue including zero, a driver's subsequent space-time status including a subsequent time and a subsequent location of the historical driver at the end of the period of idle time, or the like, or any combination thereof. In some embodiments, the period of idle time may be a predetermined duration in the idle time.

In some embodiments, the time and locations in the order record (or the spare-time record) may be quantized values. For example, the time may be quantized as intervals having a certain number of minutes, such as 1 minute, 10 minutes, 30 minutes, 300 minutes, etc. As another example, the processor 220 may divide an area into a plurality of rectangular grids or grids having other shapes. The locations may be quantized as a granularity of the rectangular grids. For example, a rectangular grid may be 1 kilometer*1 kilometer or 700 m*700 m, the location may be 1 rectangular grid, 10 rectangular grids, 100 rectangular grids, etc.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step, a preprocessing step) may be added elsewhere in the exemplary process/method 800. As another example, all the steps in the exemplary process/method 800 may be implemented in a computer-readable medium including a set of instructions. The instructions may be transmitted in a form of electronic current or electrical signals.

Figure 9:
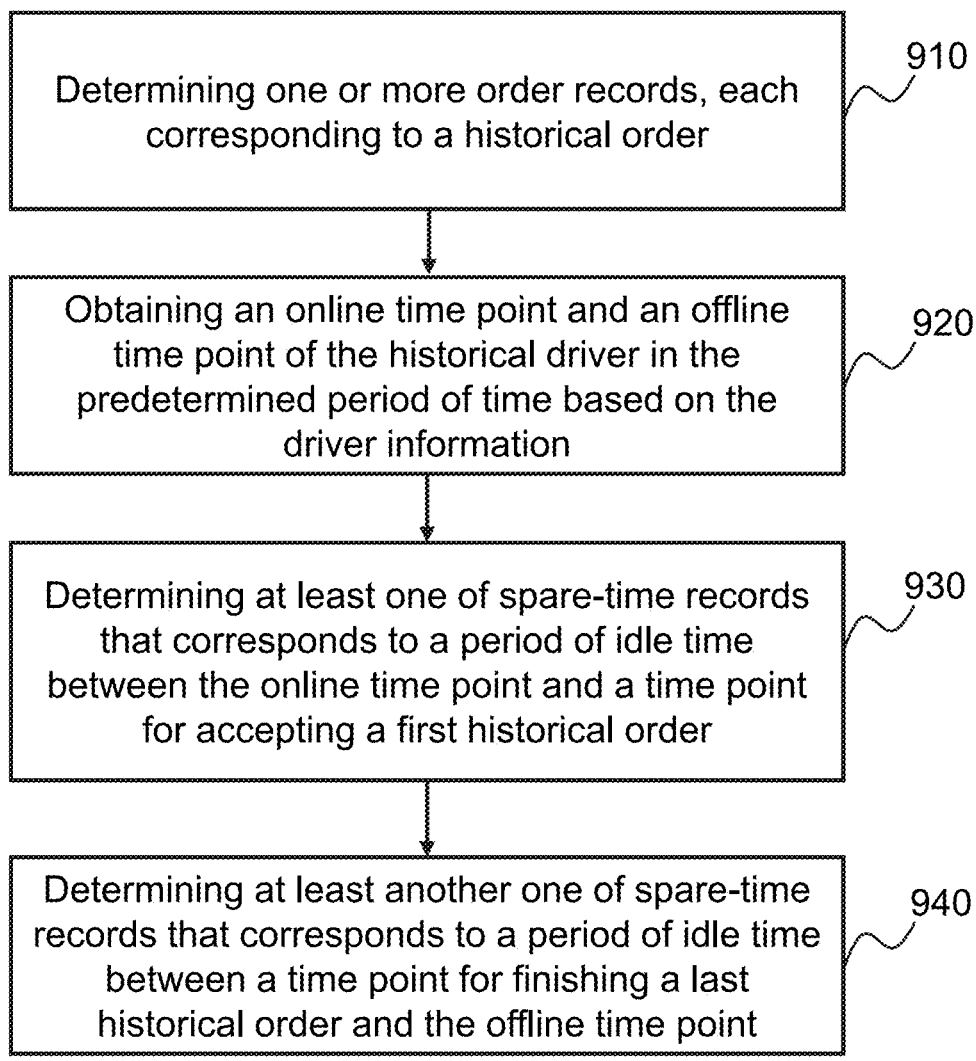
FIG. 9 is a flowchart illustrating an exemplary process and/or method for determining a plurality of records according to some embodiments of the present disclosure.

FIG. 9 is a flowchart of an exemplary process and/or method 900 for determining a plurality of records according to some embodiments of the present disclose. In some embodiments, one or more steps in the process 900 may be implemented in the system 100 illustrated in FIG. 1. For example, one or more steps in the process 900 may be stored in the storage 130 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110).

In some embodiments, the processor 220 may implement the process and/or method 900 for obtaining the plurality of records in the descriptions of FIG. 5. For example, the processor 220 may implement the process and/or method 900 for demining one or more order records and/or one or more spare-time records according to a decision-making processes model (e.g., a MDP model), so as to obtain the plurality of records including one or more order records and/or one or more spare-time records. In some embodiments, the one or more order records and/or one or more spare-time records determined in the process and/or method 900 may be used to determine a value function according to a reinforcement learning algorithm in the descriptions of FIG. 5.

In 910, the processor 220 (or the record determination module 420) may determine one or more order records. In some embodiments, each order record may correspond to a historical order. The order record may be described in connection with FIG. 8 and the description thereof in the present disclosure.

In 920, the processor 220 (or the record determination module 420) may obtain an online time point and an offline time point of the historical driver in the predetermined period of time based on the driver information.

In some embodiments, the processor 220 may extract an online time point and an offline time point of the historical driver in the predetermined period of time from the driver information. The predetermined period of time may be determined according to different application scenarios. For example, the predetermined period may be an hour, several hours, one day, a week, a month, a year, etc.

In some embodiments, the online time point may refer to a time point that the historical driver was connected to the online platform, and prepared to be allocated or accept an order, or was serving a historical order. For example, the online time point may be a time point that the historical driver logged in an application installed in the driver's mobile device via the network 150. As still another example, the online time point may be a time point that the historical driver turned on a switch in the application to start a service function via the network 150.

In some embodiments, the offline time point may refer to a time point that the historical driver disconnected from the online platform, and was unavailable to be allocated or accept an order. For example, the offline time point may be a time point that the historical driver logged out an application installed in the driver's mobile device via the network 150. As still another example, the offline time point may be a time point that the historical driver turned off a switch in the application to close a service function via the network 150.

In 930, the processor 220 (or the record determination module 420) may determine at least one of spare-time records that corresponds to a period of idle time between the online time point and a time point for accepting a first historical order. In some embodiments, such one of the spare-time record corresponds to a time period after the driver logged on and before the driver started the first order.

In some embodiments, the processor 220 may first obtain the time point for accepting the first historical order during the predetermined period of time from the order information and the corresponding driver information. During the online time point and the time point for accepting the first historical order, the processor 220 may generate a spare-time record in every period of idle time. For example, a historical driver came online at 7:55 of a day, and at 8:23, he/she accepted (or was allocated to) a historical order. The processor 220 may generate two spare-time records between 8:00 to 8:30: Record 1: "from 8:00 to 8:10, started from Location A" (a driver's space-time status (S)), "to 8:10 to 8:20, ended at Location A" (a driver's subsequent space-time status (P)), "Revenue is 0" (a driver's revenue (R)); and Record 2: "from 8:10 to 8:20, started from Location A" (a driver's space-time status (S)), "to 8:20 to 8:30, ended at Location A" (a driver's subsequent space-time status (P)), Revenue is 0 (a driver's revenue (R)).

In 940, the processor 220 (or the record determination module 420) may determine at least another one of spare-time records that corresponds to a period of idle time between a time point for finishing a last historical order and the offline time point. In some embodiments, such another one of the spare-time records corresponds to a time period after the driver finished the last order and before the driver logged out.

In some embodiments, the processor 220 may first obtain the time point for finishing the last historical order during the predetermined period of time from the order information and the corresponding driver information. Between the time point for finishing the last historical order and the offline time point, the processor 220 may generate a spare-time record in every period of idle time. For example, a historical driver accepted (or was allocated to) a last historical order in a day at 17:35, and went offline at 18:01. The processor 220 may generate two spare-time records between 17:30 to 18:00: Record 1: "from 17:30 to 17:40, started from Location C" (a driver's space-time status (S)), "to 17:40 to 17:50, ended at Location V" (a driver's subsequent space-time status (P)), "Revenue is 0" (a driver's revenue (R)); and Record 2: "from 17:40 to 17:50, started from Location C" (a driver's space-time status (S)), "to 17:50 to 18:00, ended at Location C" (a driver's subsequent space-time status (P)), "Revenue is 0" (a driver's revenue (R)).

In some embodiments, the processor 220 may not determine (or generate) any spare-time record during the period of time before the online time point or the period of time after the time point for finishing the last historical order. In certain embodiments, the lack of such records may reflect the promptness of the historical driver in getting the first historical order after logging on or logging off after the last historical order.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step, a preprocessing step) may be added elsewhere in the exemplary process/method 900. As another example, all the steps in the exemplary process/method 900 may be implemented in a computer-readable medium including a set of instructions. The instructions may be transmitted in a form of electronic current or electrical signals.

Figure 10:
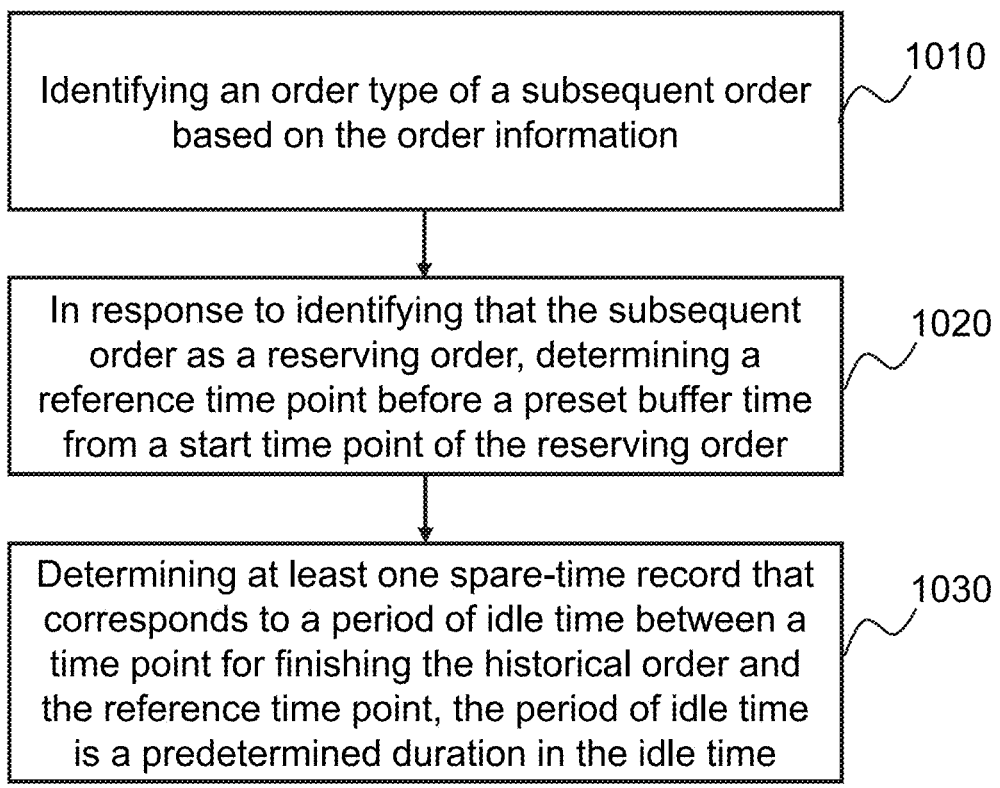
FIG. 10 is a flowchart illustrating an exemplary process and/or method for determining a plurality of records according to some embodiments of the present disclosure.

FIG. 10 is a flowchart of an exemplary process and/or method 1000 for determining a plurality of records according to some embodiments of the present disclose. In some embodiments, one or more steps in the process 1000 may be implemented in the system 100 illustrated in FIG. 1. For example, one or more steps in the process 1000 may be stored in the storage 130 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110).

In some embodiments, the processor 220 may implement the process and/or method 1000 for obtaining the plurality of records in the descriptions of FIG. 5. For example, the processor 220 may implement the process and/or method 1000 for demining one or more spare-time records according to a decision-making processes model (e.g., a MDP model), so as to obtain the plurality of records. In some embodiments, the one or more spare-time records determined in the process and/or method 1000 may be used to determine a value function according to a reinforcement learning algorithm in the descriptions of FIG. 5.

In 1010, the processor 220 (or the record determination module 420) may identify an order type of a subsequent order based on the order information.

In some embodiments, the order type may refer to a kind of service that is provided by the online on-demand platform. For example, the order type may include a taxi order, an express car order, a private car order, a carpooling order, a bus order, a hitch order, a reserving order, a real-time order, or the like, or any combination thereof. In some embodiments, specific vehicles (and thus their associated drivers) can only handle certain order types. In some embodiments, some order types are only available at specific time periods. In some embodiments, an order may belong to one or more order types (e.g., an order may be both a carpooling order and a private car order). In some embodiments, the processor 220 may identify the order type based on the vehicle associated with the subsequent order or the time information of the subsequent order.

In some embodiments, the subsequent order may refer to an order started at a most proximate time from an end time of a certain historical order (also referred to as the time finishing the certain historical order). For example, the end time of the certain historical order is 10:00, the subsequent order may be an order that starts at a closest time point after 10:00, with no other orders in between.

In 1020, in response to identifying that the subsequent order as a reserving order, the processor 220 (or the record determination module 420) may determine a reference time point before a preset buffer time from a start time point of the reserving order.

In some embodiments, the processor 220 may obtain the start time point of the reserving order from the order information. In some embodiments, the preset buffer time may be determined according to different application scenarios. For example, the preset buffer time may be different according to different areas, different start time of the reserving order, or the like, or any combination thereof. As another example, the preset buffer time may be a certain period of time determined by the system 100. For example, the preset buffer time may be 1 hour, 30 minutes, 10 minutes, 5 minutes, etc.

Before the start time point of the reserving order, the processor 220 may determine the reference time point before the preset buffer time from the start time point of the reserving order. For example, the preset buffer time is 30 minutes, the start time point of the reserving order is 13:45, and the reference time point may be 13:15.

In 1030, the processor 220 (or the record determination module 420) may determine at least one spare-time record that corresponds to a period of idle time between a time point for finishing the historical order and the reference time point.

From the time point for finishing the historical order to the reference time point, the processor 220 may generate a spare-time record every period of idle time. For example, a historical driver finished a historical order at 10:00, the start time point of the reserving order is 13:45, and the reference time point is 13:15. From 10:00 to 13:15, the processor 220 may generate a spare-time record every 10 minutes.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step, a preprocessing step) may be added elsewhere in the exemplary process/method 1000. As another example, all the steps in the exemplary process/method 1000 may be implemented in a computer-readable medium including a set of instructions. The instructions may be transmitted in a form of electronic current or electrical signals.

Figure 11:
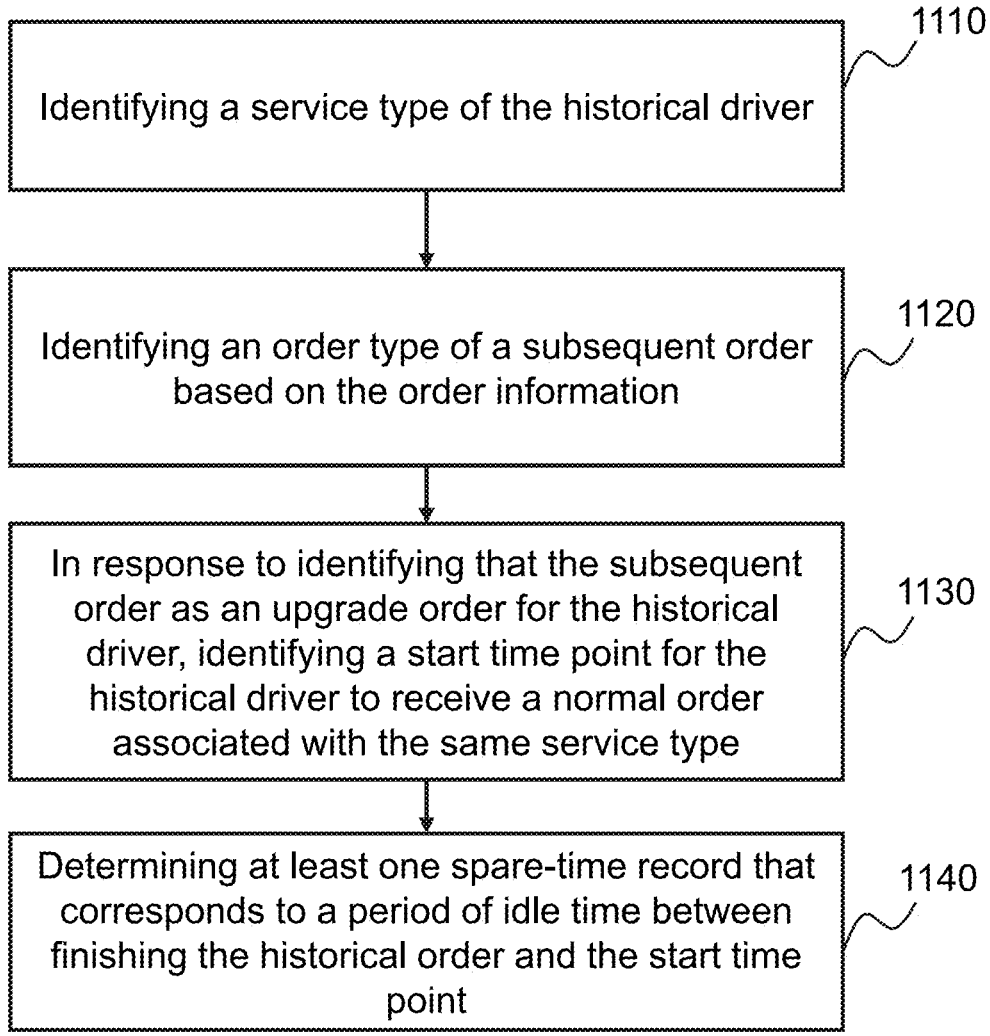
FIG. 11 is a flowchart illustrating an exemplary process and/or method for determining a plurality of records according to some embodiments of the present disclosure.

FIG. 11 is a flowchart of an exemplary process and/or method 700 for determining a first matching value for each driver-order pair according to some embodiments of the present disclose. In some embodiments, one or more steps in the process 1100 may be implemented in the system 100 illustrated in FIG. 1. For example, one or more steps in the process 1100 may be stored in the storage 130 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110).

In some embodiments, the processor 220 may implement the process and/or method 1100 for obtaining the plurality of records in the descriptions of FIG. 5. For example, the processor 220 may implement the process and/or method 1100 for demining one or more spare-time records according to a decision-making processes model (e.g., the MDP model), so as to obtain the plurality of records. In some embodiments, the one or more spare-time records determined in the process and/or method 1100 may be used to determine a value function according to a reinforcement learning algorithm in the descriptions of FIG. 5.

In 1110, the processor 220 (or the record determination module 420) may identify a service type of the historical driver.

In some embodiments, the service type may refer to a kind of service that a driver may offer with his/her vehicle. In some embodiments, the service type may be associated with the vehicle of the driver because certain vehicles are allowed to serve certain types of orders. For example, the service type of a historical driver may include a taxi service, an express car service, a private car service, a bus service, or the like, or any combination thereof. In some embodiments, the processor 220 may identify the service type based on a vehicle information of the driver.

In 1120, the processor 220 (or the record determination module 420) may identify an order type of a subsequent order based on the order information.

For example, the order type may include a taxi order, an express car order, a private car order, a bus order, or the like, or any combination thereof. In some embodiments, the processor 220 may identify the order type based on a vehicle associated with the subsequent order.

In some embodiments, the subsequent order may refer to an order started at a most proximate time after an end time of a certain historical order (also refers to as the time finishing the certain historical order). For example, the end time of the certain historical order is 10:00, the subsequent order may be an order that started at a closest time point after 10:00, with no other orders in between.

In 1130, in response to identifying that the subsequent order as an upgrade order for the historical driver, the processor 220 (or the record determination module 420) may identify a start time point for the historical driver to receive a normal order associated with the same service type.

In some embodiments, the upgrade order may refer to an order that mismatches with a driver. For example, the order type of the upgrade order is different from the order type that the service type of driver provides. As another example, when a private car driver receives (or is allocated to) an express car order (or a taxi order), the express car order (or the taxi order) is an upgrade order for the private car driver. In some embodiments, the processor 220 may identify the upgrade order based on the order type of the subsequent order and the service type of the historical driver.

In some embodiments, the normal order associated with the same service type may refer to an order of a same order type with the service type of the historical driver. For example, the historical driver is a private car driver, the normal order may be a private car order.

In some embodiments, the processor 220 may identify the normal order associated with the same service type based on the order information and the driver information. For example, the processor 220 may first determine an area where the historical driver accepted (or was allocated to) the upgrade order, and a time point that the historical driver finished the historical order based on the order information and the corresponding driver information. The processor 220 may obtain a plurality of normal orders of the same service type, and compare the start time to receive the plurality of normal orders. The time point that is closest to the time point of finishing the historical order may be identified as the start point for the historical driver to receive the normal order.

In 1140, the processor 220 (or the record determination module 420) may determine at least one spare-time record that corresponds to a period of idle time between finishing the historical order and the start time point.

From the time point for finishing the historical order to the start time point of the normal order, the processor 220 may generate a spare-time record in every period of idle time. For example, the processor 220 may generate a spare-time record every 10 minutes the time point for finishing the historical order and the start time point of the normal order.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step, a preprocessing step) may be added elsewhere in the exemplary process/method 1100. As another example, all the steps in the exemplary process/method 1100 may be implemented in a computer-readable medium including a set of instructions. The instructions may be transmitted in a form of electronic current or electrical signals.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure, and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system for determining and optimizing an allocation strategy for an online on-demand transportation service, comprising:
   at least one storage medium including a set of instructions for determining a value function in an online on-demand transportation service; and
   at least one processor in communication with the storage medium, wherein when executing the set of instructions, the at least one processor is directed to:
   store, into the at least one storage medium, a plurality of historical orders collected from a plurality of passenger terminals and a plurality of driver terminals;
   obtain order information associated with the plurality of historical orders by accessing the at least one storage medium;
   obtain driver information associated with a plurality of historical drivers corresponding to the plurality of historical orders by accessing the at least one storage medium;
   for each historical driver during a predetermined period of time, determine a plurality of records based on the order information and the driver information according to a decision-making processes model, wherein each record includes a driver's space-time status, a driver's action, a driver's revenue, and a driver's subsequent space-time status, and the decision-making processes model is a Markov Decision Process (MDP) model, wherein the order information and the driver information are inputs of the MDP model, and the outputs of the MDP model are the plurality of records;
   determine a value function based on the plurality of records of each historical driver according to a reinforcement learning model, wherein the plurality of records of each historical driver are inputs of the reinforcement learning model, and the output of the reinforcement learning model is the value function; and
   utilize the value function to determine an allocation strategy for the online on-demand transportation service.

2. The system of claim 1, wherein the reinforcement learning model is a temporal-difference learning model or a dynamic programming model.

3. The system of claim 1, wherein for each historical driver during the predetermined period of time, to determine the plurality of records, the at least one processor is further directed to:
   determine one or more order records, each corresponding to a historical order; and
   determine one or more spare-time records, each corresponding to a period of idle time not associated with any historical order.

4. The system of claim 1, wherein for each historical driver during the predetermined period of time, to determine the plurality of records, the at least one processor is further directed to:
   determine one or more order records, each corresponding to a historical order;
   obtain an online time point and an offline time point of the historical driver in the predetermined period of time based on the driver information;

determine at least one of spare-time records that corresponds to a period of idle time between the online time point and a time point for accepting a first historical order; and determine at least another one of spare-time records that corresponds to a period of idle time between a time point for finishing a last historical order and the offline time point.

5. The system of claim 1, wherein the plurality of records include at least one order record and at least one spare-time record, wherein an order record corresponds to a historical order and includes at least one of:
- a driver's space-time status including a time and a location of the historical driver when accepting the historical order,
- a driver's action including accepting the historical order,
- a driver's revenue including a value of the historical order, or
- a driver's subsequent space-time status including a time and a location of the historical driver when finishing the historical order; and wherein a spare-time record corresponds to a period of idle time not associated with any historical order and includes at least one of:
- a driver's space-time status including a time and a location of the historical driver during the period of idle time,
- a driver's action including being idle during the period of idle time,
- a driver's revenue including zero, or
- a driver's subsequent space-time status including a subsequent time and a subsequent location of the historical driver at the end of the period of idle time, wherein the period of idle time is a predetermined duration in the idle time.

6. The system of claim 5, wherein for each historical driver during the predetermined period of time, to determine the plurality of records, the at least one processor is further directed to:
identify an order type of a subsequent order based on the order information;
in response to identifying that the subsequent order is a reserving order, determine a reference time point before a preset buffer time from a start time point of the reserving order; and
determine at least one spare-time record that corresponds to a period of idle time between a time point for finishing the historical order and the reference time point.

7. The system of claim 5, wherein for each historical driver during the predetermined period of time, to determine the plurality of records, the at least one processor is further directed to:
identify a service type of the historical driver;
identify an order type of a subsequent order based on the order information;
in response to identifying that the subsequent order is an upgrade order for the historical driver, identify a start time point for the historical driver to receive a normal order associated with the same service type; and
determine at least one spare-time record that corresponds to a period of idle time between finishing the historical order and the start time point.

8. The system of claim 5, wherein for each historical driver during the predetermined period of time, to determine the plurality of records, the at least one processor is further directed to:
determine the order record that corresponds to the historical order, wherein
the historical order is a general carpooling order that combines a plurality of carpooling orders having a same route ID,
the time and the location of the historical driver are respectively a time and a location of the historical driver when first accepting the general carpooling order, and
the value of the historical order is a sum of values of the carpooling orders.

9. The system of claim 1, wherein when executing the set of instructions, the at least one processor is further directed to:
optimize allocations of the drivers to the incoming orders based on the value function.

10. A method for determining and optimizing an allocation strategy for an online on-demand transportation service implemented on a computing device having at least one processor, at least one storage medium, and a communication platform connected to a network, comprising:
storing, into the at least one storage medium, a plurality of historical orders collected from a plurality of passenger terminals and a plurality of driver terminals;
obtain order information associated with the plurality of historical orders by accessing the at least one storage medium;
obtaining driver information associated with a plurality of historical drivers corresponding to the plurality of historical orders by accessing the at least one storage medium;
for each historical driver during a predetermined period of time, determining a plurality of records based on the order information and the driver information according to a decision-making processes model, wherein each record includes a driver's space-time status, a driver's action, a driver's revenue, and a driver's subsequent space-time status, and the decision-making processes model is a Markov Decision Process (MDP) model, wherein the order information and the driver information are inputs of the MDP model, and the outputs of the MDP model are the plurality of records;
determining a value function based on the plurality of records of each historical driver according to a reinforcement learning model, wherein the plurality of records of each historical driver are inputs of the reinforcement learning model, and the output of the reinforcement learning model is the value function; and
utilizing the value function to determine an allocation strategy for the online on-demand transportation service.

11. The method of claim 10, wherein the reinforcement learning model is a temporal-difference learning model or a dynamic programming model.

12. The method of claim 10, wherein for each historical driver during the predetermined period of time, the determining the plurality of records includes:
determining one or more order records, each corresponding to a historical order; and
determining one or more spare-time records, each corresponding to a period of idle time not associated with any historical order.

13. The method of claim 10, wherein for each historical driver during the predetermined period of time, the determining the plurality of records includes:
   determining one or more order records, each corresponding to a historical order;
   obtaining an online time point and an offline time point of the historical driver in the predetermined period of time based on the driver information;
   determining at least one of spare-time records that corresponds to a period of idle time between the online time point and a time point for accepting a first historical order; and
   determining at least another one of spare-time records that corresponds to a period of idle time between a time point for finishing a last historical order and the offline time point.

14. The method of claim 10, wherein the plurality of records include at least one order record and at least one spare-time record,
   wherein an order record corresponds to a historical order and includes at least one of:
      a driver's space-time status including a time and a location of the historical driver when accepting the historical order,
      a driver's action including accepting the historical order,
      a driver's revenue including a value of the historical order, and
      a driver's subsequent space-time status including a time and a location of the historical driver when finishing the historical order; or
   wherein a spare-time record corresponds to a period of idle time not associated with any historical order and includes at least one of:
      a driver's space-time status including a time and a location of the historical driver during the period of idle time,
      a driver's action including being idle during the period of idle time,
      a driver's revenue including zero, or
      a driver's subsequent space-time status including a subsequent time and a subsequent location of the historical driver at the end of the period of idle time, wherein the period of idle time is a predetermined duration in the idle time.

15. The method of claim 14, wherein for each historical driver during the predetermined period of time, the determining the plurality of records includes:
   identifying an order type of a subsequent order based on the order information;
   in response to identifying that the subsequent order is a reserving order, determining a reference time point before a preset buffer time from a start time point of the reserving order; and
   determining at least one spare-time record that corresponds to a period of idle time between a time point for finishing the historical order and the reference time point.

16. The method of claim 14, wherein for each historical driver during the predetermined period of time, the determining the plurality of records includes:
   identifying a service type of the historical driver;
   identifying an order type of a subsequent order based on the order information;
   in response to identifying that the subsequent order is an upgrade order for the historical driver, identifying a start time point for the historical driver to receive a normal order associated with the same service type; and
   determining at least one spare-time record that corresponds to a period of idle time between finishing the historical order and the start time point.

17. The method of claim 14, wherein for each historical driver during the predetermined period of time, the determining the plurality of records includes:
   determining the order record that corresponds to the historical order, wherein
      the historical order is a general carpooling order that combines a plurality of carpooling order having a same route ID,
      the time and the location of the historical driver are respectively a time and a location of the historical drive when first accepting the general carpooling order, and
      the value of the historical order is a sum of values of the carpooling orders.

18. A non-transitory computer readable medium, comprising at least one set of instructions for determining and optimizing an allocation strategy for an online on-demand transportation service, wherein when executing the set of instructions, the at least one set of instructions directs the at least one processor to:
   store, into at least one storage medium, a plurality of historical orders collected from a plurality of passenger terminals and a plurality of driver terminals;
   obtain order information associated with the plurality of historical orders by accessing the at least one storage medium;
   obtain driver information associated with a plurality of historical drivers corresponding to the plurality of historical orders by accessing the at least one storage medium;
   for each historical driver during a predetermined period of time, determine a plurality of records based on the order information and the driver information according to a decision-making processes model, wherein each record includes a driver's space-time status, a driver's action, a driver's revenue, and a driver's subsequent space-time status, and the decision-making processes model is a Markov Decision Process (MDP) model, wherein the order information and the driver information are inputs of the MDP model, and the outputs of the MDP model are the plurality of records;
   determine a value function based on the plurality of records of each historical driver according to a reinforcement learning model, wherein the plurality of records of each historical driver are inputs of the reinforcement learning model, and the output of the reinforcement learning model is the value function; and
   utilize the value function to determine an allocation strategy for the online on-demand transportation service.

* * * * *